United States Patent
Budd

(10) Patent No.: US 11,731,897 B2
(45) Date of Patent: Aug. 22, 2023

(54) SEALING COMPOSITIONS

(71) Applicant: COORSTEK MEMBRANE SCIENCES AS, Oslo (NO)

(72) Inventor: Michael Ian Budd, Oslo (NO)

(73) Assignee: COORSTEK MEMBRANE SCIENCES AS, Oslo (NO)

(*) Notice: Subject to any disclaimer, the term of this patent is extended or adjusted under 35 U.S.C. 154(b) by 252 days.

(21) Appl. No.: 16/955,460

(22) PCT Filed: Dec. 19, 2018

(86) PCT No.: PCT/EP2018/085926
§ 371 (c)(1),
(2) Date: Jun. 18, 2020

(87) PCT Pub. No.: WO2019/121972
PCT Pub. Date: Jun. 27, 2019

(65) Prior Publication Data
US 2021/0139366 A1 May 13, 2021

(30) Foreign Application Priority Data

Dec. 19, 2017 (GB) ..................... 1721341

(51) Int. Cl.
| | |
|---|---|
| *C03C 8/08* | (2006.01) |
| *C03C 8/02* | (2006.01) |
| *C03C 8/04* | (2006.01) |
| *C03C 10/00* | (2006.01) |
| *H01M 8/0282* | (2016.01) |
| *H01M 8/1246* | (2016.01) |
| *H01M 8/12* | (2016.01) |

(52) U.S. Cl.
CPC .................. *C03C 8/08* (2013.01); *C03C 8/02* (2013.01); *C03C 8/04* (2013.01); *C03C 10/0036* (2013.01); *H01M 8/0282* (2013.01); *H01M 8/1246* (2013.01); *H01M 2008/1293* (2013.01); *H01M 2300/0074* (2013.01)

(58) Field of Classification Search
CPC ......... C03C 8/02; C03C 8/04; C03C 10/0036; H01M 8/0282; H01M 8/1246
See application file for complete search history.

(56) References Cited

U.S. PATENT DOCUMENTS

| | | |
|---|---|---|
| 4,853,349 A | 8/1989 | Martin |
| 9,522,842 B2 | 12/2016 | Nonnet et al. |
| 2003/0228968 A1 | 12/2003 | Usui et al. |
| 2008/0090715 A1* | 4/2008 | Badding ................. C03C 29/00 501/15 |
| 2009/0239122 A1 | 9/2009 | Brow et al. |
| 2010/0129726 A1* | 5/2010 | Tanida ................ H01M 8/0282 429/479 |
| 2012/0316052 A1 | 12/2012 | Akamatsu et al. |
| 2013/0272774 A1 | 10/2013 | Goedeke et al. |
| 2013/0294818 A1 | 11/2013 | Goedeke |
| 2014/0169862 A1* | 6/2014 | Gonzalez .............. C04B 37/005 156/326 |

FOREIGN PATENT DOCUMENTS

| | | |
|---|---|---|
| JP | H0595994 | 4/1993 |
| JP | 2008120648 | 5/2008 |
| WO | 2014049117 A1 | 4/2014 |
| WO | 2018066635 | 4/2018 |

OTHER PUBLICATIONS

International Search Report from PCT/EP2018/085958 dated Apr. 10, 2019.
International Search Report from PCT/EP2018/085926 dated Mar. 29, 2019.

* cited by examiner

*Primary Examiner* — Karie O'Neill Apicella
(74) *Attorney, Agent, or Firm* — Thomas | Horstemeyer, LLP

(57) ABSTRACT

The present invention relates to compositions in the form of precursor glass powders, pastes and preforms comprising said precursor glass powders, and glass-ceramics produced from the precursor glass powders, pastes or preforms.

The present invention also relates to a method of forming a seal between a first and second material with a glass-ceramic, and a joint comprising a first material, a second material and a glass-ceramic sealing material joining the first and second materials together.

22 Claims, 3 Drawing Sheets

SEALING COMPOSITIONS

FIELD

The present invention relates to glass-ceramic compositions ideally with coefficients of thermal expansion (CTE) in the range $5.5\text{-}10\times10^{-6}$ K$^{-1}$ (over the range of 25-1000° C.) which may be used to seal other materials having similar CTEs together. The invention also relates to glass-ceramic precursor compositions, a method of sealing materials together using the glass-ceramic precursor compositions, joints sealed with the glass-ceramic compositions, and electrochemical reactors based on ceramic membranes comprising such joints.

BACKGROUND

There are many application areas employing ceramics where sealing or joining is usefully employed in the fabrication of components or assemblies. Examples range from relatively simple components such as gas flow manifolds, to more complex assemblies, such as ceramic membrane based electrochemical reactors. One particular example is in the fabrication of planar solid oxide fuel cells (SOFCs) where several different materials are hermetically sealed together to form a functioning stack. There are other application areas, such as high temperature electrolysers, electrochemical oxygen generators etc. where oxygen-conducting, proton-conducting or mixed-conducting ceramic membranes are required to be sealed in an electrochemical reactor of some description. The seals are required to be hermetic, and sufficiently refractory to survive for extended periods at the elevated operating temperature of the reactor (e.g. in the range 600-1000° C.). They should also be chemically stable under the working atmosphere on both sides of the seal, and chemically compatible with the materials to which they are sealed. It is also important that they have similar CTE to the materials with which they are in contact in order to avoid unfavourable stresses which might lead to crack formation under thermal cycling.

Glass-ceramic materials have previously been used for sealing applications, with a significant proportion of this devoted to sealing materials for SOFCs, where CTE values in the range $10\text{-}14\times10^{-6}$ K$^{-1}$ are generally required.

Tulyaganov et al. [Journal of Power Sources, 242, (2013) 486-502] presents a review of sealants for SOFCs and other applications, primarily based on aluminosilicate compositions. This indicates that alkaline-earth aluminosilicate glass-ceramics, and particularly barium aluminosilicate materials (with typically 30-35 mol % BaO) are the most widely used glass-ceramics for this particular sealing application. It is recognised, however, that there are some problems associated with the high barium content, particularly reactivity towards chromium containing alloys (to form high CTE BaCrO$_4$ at the interface) and potential development of low expansion barium aluminosilicate phases in the sealing material after extended periods at service temperatures. Consequently, considerable effort has been expended on reducing the barium content or formulating barium-free glass-ceramics for SOFC sealing, for instance, by substituting SrO and/or CaO for much or all of the BaO.

Development studies have also been performed on glass-ceramic sealants where diopside is one of the major crystallizing phases, see A. Goel et al. [J. Eur. Ceram. Soc. 27 (2007) 2325-2331], A. Goel et al. [J. Non-Cryst. Solids 3355 (2009) 193-202], and A. A. Reddy et al. [Int. J. Hydrogen Energy 37 (2012) 12,528-12,539]. These diopside based glass-ceramic sealants all contain some Al$_2$O$_3$ and many of them contain B$_2$O$_3$, which is reported to improve flow behaviour, but is known to increase volatility in high temperature steam environments. CTEs in the range $8.2\text{-}11.5\times10^{-6}$ K$^{-1}$ [20-700° C.] are reported for these diopside based glass-ceramics.

U.S. Pat. No. 6,430,966 describes alkaline earth aluminosilicate glass-ceramics of formula M$_A$O$_x$-M$_B$O$_y$—SiO$_2$ for use as SOFC sealing materials. M$_A$ is Ba, Sr, Ca or combinations thereof and M$_B$ includes Al, B, P, Ga and Pb. These contain 20-50 mol % (M$_A$O$_x$), >5 to 15 mol % Al$_2$O$_3$ and 45-70 mol % SiO$_2$ as main constituents and typically cover a CTE range of $7\text{-}15\times10^{-6}$ K$^{-1}$. All exemplified ceramics comprise BaO, Al$_2$O$_3$ and SiO$_2$, with a minor component of SrO, CaO or K$_2$O.

U.S. Pat. No. 6,532,769 describes glass-ceramic compositions of formula M1-M2-M3, in which M1 is 20-55 mol % BaO, SrO, CaO and/or MgO, M2 is 2-15 mol % Al$_2$O$_3$, and M3 is 40-70 mol % SiO$_2$ containing at least some B$_2$O$_3$. All exemplified glass-ceramics comprise BaO, Al$_2$O$_3$ and SiO$_2$, with a minor component of SrO or CaO.

U.S. Pat. Nos. 7,470,670 and 7,674,735 describe glass-ceramics seals which are based on alkaline-earth aluminosilicate compositions which comprise SiO$_2$, Al$_2$O$_3$ and CaO. In addition to these components, exemplified glass-ceramics further comprise one or more of SrO, BaO, MgO, ZnO, Nb$_2$O$_5$ and Ta$_2$O$_5$. The sealing compositions have a crystalline component in which >50 wt. % of the crystalline component has a structure selected from walstromite, cyclowollastonite, μ-(Ca,Sr)SiO$_3$, kalsilite, kaliophilite and wollastonite.

U.S. Pat. No. 7,378,361 describes glass-ceramic compositions and in an embodiment describes a composition comprising 45-55 wt % SiO$_2$, 25-40 wt % CaO, 3-6 wt % Al$_2$O$_3$ and 4-15 wt % MgO, where the amount of CaO+MgO is in the range 40-50 wt %.

U.S. Pat. No. 7,410,921 describes glass-ceramic compositions and in an embodiment describes a composition comprising 45-55 wt % SiO$_2$, 25-40 wt % CaO, 0-25 wt % SrO, 3-6 wt % Al$_2$O$_3$ and 4-15 wt % MgO, where the amount of CaO+MgO+SrO is in the range 38-50 wt %.

U.S. Pat. No. 7,674,735 describes glass-ceramic compositions comprising 30 to 50 wt % silica, 2 to 8 wt % aluminium oxide and 10 to 40 wt % calcium oxide.

U.S. Pat. No. 9,522,842 describes a range of glass-ceramic compositions, including some materials in the CaO—Al$_2$O$_3$—SiO$_2$ system, which are claimed to be suitable for sealing/joining SOFC and high temperature electrolyser (HTE) components. The compositional limits for the calcium aluminosilicate based materials are 36-43 mol % SiO$_2$, 9-13 mol % Al$_2$O$_3$ and 38-50 mol % CaO with optional additions of oxides selected from ZnO, MnO$_2$, B$_2$O$_3$, Cr$_2$O$_3$ and TiO$_2$. No description of the CTE of these glass-ceramics is provided.

U.S. Pat. No. 6,699,807 describes the use of CaO—Al$_2$O$_3$—SiO$_2$ based glass-ceramics as a gas-tight seal in spark plugs which can be tailored to have a CTE closely matching that of alumina. The glass-ceramic in this case has a composition in the range 38-48 wt % SiO$_2$, 15-19 wt % Al$_2$O$_3$, 4.5-10 wt % TiO$_2$ and 23-30 wt % CaO. The maximum CaO content is 30 wt %.

The present invention describes novel glass-ceramic compositions which have high softening temperatures and which can be used for the joining or sealing of materials with coefficients of thermal expansion in the range $5\text{-}11\times10^{-6}$ K$^{-1}$. These glass-ceramic compositions can be used for the sealing of materials which have lower CTEs than those which are employed in SOFCs. Our materials have improved refractoriness due to the higher $Al_2O_3$ content and enhanced chemical durability in high temperature steam environments.

SUMMARY OF THE INVENTION

In a first embodiment the invention provides a glass precursor sealing composition comprising:
(I) 14-35 mol % $Al_2O_3$;
(II) 31-52 mol % CaO; and
(III) 25-45 mol % $SiO_2$;
said composition being free of $B_2O_3$.

Viewed from another aspect, the invention provides glass-ceramic composition comprising:
(I) 14-35 mol % $Al_2O_3$;
(II) 31-52 mol % CaO; and
(III) 25-45 mol % Sift;
said composition being free of $B_2O_3$.

In a further embodiment the invention provides a paste or a preform comprising the glass precursor sealing composition as described herein. In an embodiment the preform is a tape-cast sheet. Such a sheet can readily be applied to the joint area in its "green" state where it can be sintered and crystallised to form a glass-ceramic joint as herein described.

Viewed from another aspect the invention provides a paste comprising:
A) a glass precursor sealing composition as hereinbefore defined; and
B) a liquid; and
optionally one or more organic processing aids such as binder, dispersant, plasticizer etc.

Viewed from another aspect the invention provides a preform comprising:
A) a glass precursor sealing composition as hereinbefore defined; and
B) a binder;
optionally in the form of a ring.

In certain embodiments a sintered precursor glass preform may be prepared by sintering a precursor glass sealing composition but maintaining the sintered material in an amorphous condition by performing the sintering below the crystallization temperature range of the material. The sintered preform may then form a seal on heating to form a joint.

Viewed from another aspect therefore the invention provides a sintered precursor glass preform, e.g. in the form of a ring, comprising:
(I) 14-35 mol % $Al_2O_3$;
(II) 31-52 mol % CaO; and
(III) 25-45 mol % $SiO_2$;
said composition being free of $B_2O_3$.

The glass precursor sealing composition can be prepared in a process in which a glass batch is converted to a glass precursor sealing composition, e.g. by heating a glass batch to form a homogeneous melt, cooling the same to form a precursor glass (e.g. in the form of a frit), and milling to form a glass precursor sealing composition/precursor glass powder. It will be appreciated that the cooling process is carried out in such a way as to avoid devitrification.

Viewed from another aspect the invention provides a method of forming a seal between a first material and a second material, the method comprising the steps of:
applying a glass precursor sealing composition e.g. in the form of a paste or preform as described herein or sintered glass precursor preform, between the first and second materials; and heating at a heating rate of 1 to 20° C. per minute to a temperature in the range of 950 to 1200° C.; to seal the first and second materials together to form a joint.

It is preferred that the first and second materials each have CTE values in the range of $5\text{-}11 \times 10^{-6}$ $K^{-1}$ over the range of 25-1000° C. It is preferred that the first material, second material and glass-ceramic sealing material all have CTE values in the range $5\text{-}11 \times 10^{-6}$ $K^{-1}$ over the range 25-1000° C. Preferably there is no more than $2 \times 10^{-6}$ $K^{-1}$ difference in CTE value between any of the materials.

Viewed from another aspect, the invention provides a joint comprising a first material, a second material and a glass-ceramic sealing composition sealing the first and second materials together, said glass-ceramic sealing material being obtained by heat treatment of the glass precursor sealing composition as hereinbefore defined.

In a further embodiment the invention provides an electrochemical ceramic membrane reactor comprising at least one joint according to the invention, such as a plurality of joints.

Terminology

As used herein the term "glass batch" refers to a simple blend of components (e.g. metal oxides, metal carbonates etc. . . . ) which have not undergone melt processing to form the glass precursor sealing composition.

The glass batch is heated to form a "glass melt" and is subsequently cooled (e.g. by quenching) to form a "precursor glass". The precursor glass is milled to form a "glass precursor powder", also referred to herein as a "precursor glass sealing composition".

The glass precursor sealing composition may be combined with various additives and formed into a predetermined shape, referred to as a "precursor glass preform". Alternatively, the glass precursor sealing composition/precursor glass powder may be mixed with a liquid and optionally other components to form a "precursor glass paste".

A "sintered precursor glass preform" is formed by sintering a precursor glass preform at a temperature below the crystallization temperature range.

The glass precursor sealing composition, precursor glass preform, precursor glass paste and sintered precursor glass preform are all amorphous.

A "glass-ceramic" is then formed by sintering and subsequent crystallization of the glass precursor sealing composition, e.g. a precursor glass preform or precursor glass paste (sintering and crystallization may occur in a single heating step), by a thermal treatment referred to as a sealing process. A glass-ceramic may alternatively be formed by heating and crystallising a sintered precursor glass preform.

Where CTE values are given herein, the value relates to an average CTE value over the specified temperature range.

By definition, a glass-ceramic is a material produced by the controlled crystallization of a vitreous precursor. In the present case, the vitreous precursor is in powder form, and sintering precedes crystallization. In the case where the material is applied in the form of a sintered preform, sintering is carried out in a separate thermal treatment, and the sintered preform is cooled to room temperature before use. The sintering temperature is below the crystallization temperature range, so the material, although sintered, is still completely amorphous. The crystallization then occurs during the sealing process as higher temperatures are employed.

DETAILED DESCRIPTION OF THE INVENTION

Figure 1:
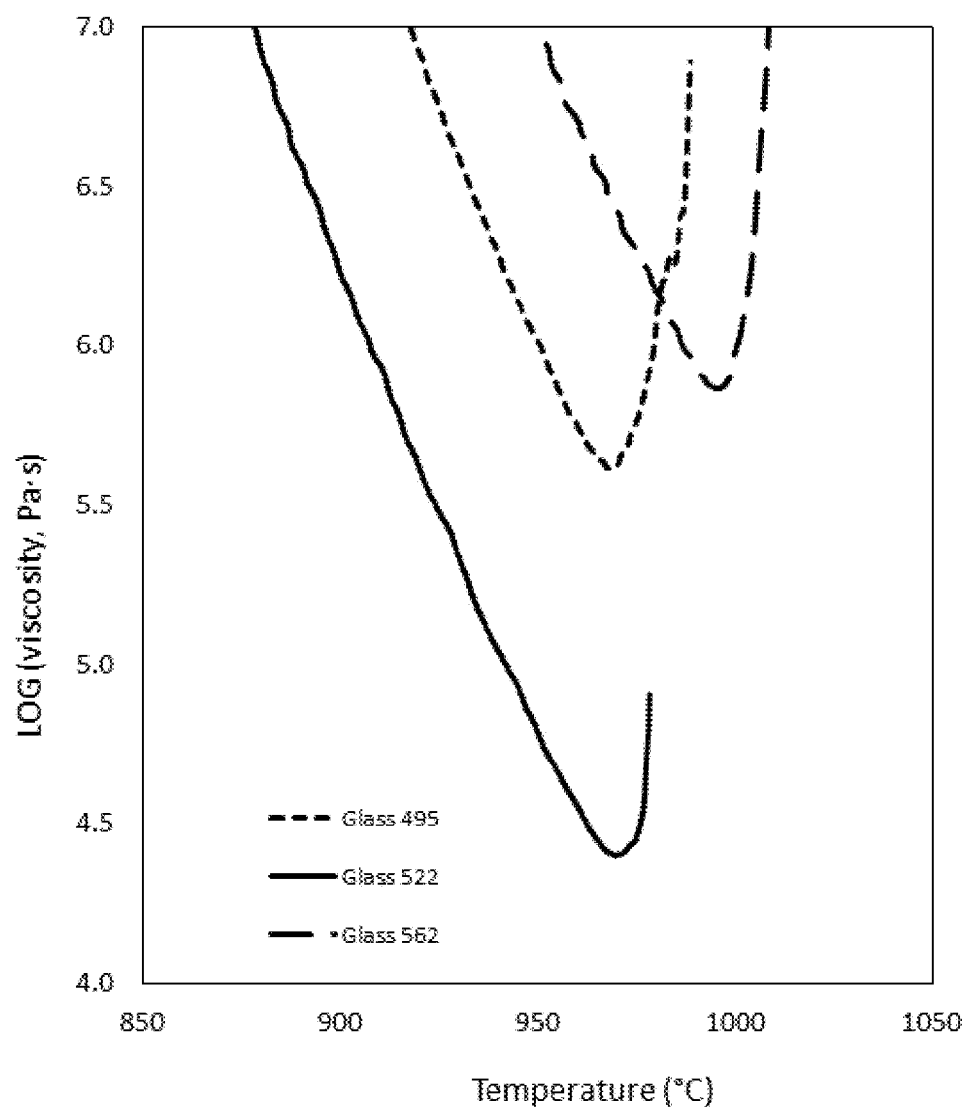
FIG. 1 shows viscosity versus temperature curves for sintered compacts of selected pre-cursor glasses during heating at 3° C./minute.

The present invention relates to a glass precursor sealing composition suitable for joining ceramics, metals and ceramic/metal composites (cermets) which have melting points above 1000° C. The invention also relates to a glass-ceramic obtained by sintering and crystallizing such a precursor composition. Such a glass-ceramic may have a CTE in the range $5\text{-}11 \times 10^{-6}$ $K^{-1}$ [25-1000° C.], preferably $6\text{-}9.5 \times 10^{-6}$ $K^{-1}$. The glass precursor sealing compositions can be readily prepared from simple initial blends, called a glass batch.

Glass Precursor Sealing Compositions

In a first embodiment, the invention relates to a glass precursor sealing composition powder comprising:
  (I) 14-35 mol % $Al_2O_3$;
  (II) 31-52 mol % CaO; and
  (III) 25-45 mol % $SiO_2$;
    said composition being free of $B_2O_3$.

In certain embodiments it is preferred that $Al_2O_3$ is present in an amount of at least 15 mol % of the sealing composition. A preferred range is 14 to 33 mol %, especially 15 to 32 mol %. Another preferred range is 21 to 35 mol %.

In certain embodiments it is preferred that CaO is present in an amount of 32 to 50 mol % of the sealing composition, preferably 35 to 47 mol %.

In certain embodiments it is preferred that $SiO_2$ is present in an amount of at least 35 mol %, such as at least 35 to 45 mol % of the sealing composition.

A preferred composition therefore comprises
  (I) 14-32 mol % $Al_2O_3$;
  (II) 32-50 mol % CaO; and
  (III) 35-45 mol % $SiO_2$.

The sealing composition is free of $B_2O_3$, i.e. below 0.1 mol % or preferably below 0.01 mol %.

Sealing compositions of the invention may further comprise one or more additional oxides selected from transition metal oxides, lanthanide group oxides (e.g. $La_2O_3$), alkaline earth oxides, $GeO_2$ and $P_2O_5$. Preferred additional oxides include MgO, $ZrO_2$, $TiO_2$, $P_2O_5$, BaO, SrO, $La_2O_3$, $Y_2O_3$, $Nb_2O_5$ and $GeO_2$.

It is preferred, however if the MgO content of the sealing compositions of the invention is 1 mol % or less, such as 0.5 mol % or less.

It is preferred if the ZnO content of the sealing compositions of the invention is 1 mol % or less, such as 0.5 mol % or less.

It is preferred however if the sealing compositions of the invention contain no MgO. It is preferred however, if the sealing compositions of the invention contain no ZnO.

In some embodiments the compositions are free of MgO and ZnO, i.e. these oxides are at levels of below 0.1 mol %, preferably below the limit of detection.

The total content of oxides other than $Al_2O_3$, CaO and $SiO_2$ is preferably 0-30 mol %, preferably 0-20 mol %, more preferably 0-15 mol %, especially 1.0-10.0 mol %, e.g. 1.5 to 5.0 mol %. If present, the minimum value of any other oxide may be 0.1 mol %, preferably 1.0 mol %. It is sometimes advantageous to add small amounts of transition metal oxides to impart some colour. When the transition metal compounds are added for colour then a minimum of 0.01 mol % is acceptable.

Viewed from another aspect therefore the invention provides a glass precursor sealing composition comprising:
  (I) 14-35 mol % $Al_2O_3$;
  (II) 31-52 mol % CaO; and
  (III) 25-45 mol % $SiO_2$;
  (IV) 0 to 30 mol % of at least one oxide selected from transition metal oxide(s), lanthanide group oxide(s), alkaline earth oxide(s), $GeO_2$ and $P_2O_5$;
    said composition being free of $B_2O_3$.

In a preferred embodiment the glass precursor sealing composition comprises, or consists of: $Al_2O_3$, CaO, $SiO_2$ and optionally one or more oxides selected from: $ZrO_2$, $TiO_2$, $P_2O_5$, BaO, $La_2O_3$, $Y_2O_3$, and $Nb_2O_5$.

In a more preferred embodiment the glass precursor sealing composition consists of $Al_2O_3$, CaO, $SiO_2$ and optionally one or more oxides selected from $P_2O_5$, $Y_2O_3$, and $ZrO_2$, such as 1.0 to 5 mol % $P_2O_5$, $Y_2O_3$, and/or $ZrO_2$.

In a more preferred embodiment the glass precursor sealing composition consists of $Al_2O_3$, CaO, $SiO_2$ and optionally one or more oxides selected from $P_2O_5$, $Y_2O_3$, and $ZrO_2$, such as 1.0 to 5 mol % $P_2O_5$, $Y_2O_3$, and/or $ZrO_2$.

In a more preferred embodiment the glass precursor sealing composition consists of $Al_2O_3$, CaO, $SiO_2$ and optionally one or more oxides selected from $P_2O_5$, $Y_2O_3$, and BaO, such as 1.0 to 5 mol % $P_2O_5$, $Y_2O_3$, and/or BaO.

Glass Batch

Glass precursor sealing compositions according to the present invention are preferably prepared by firstly melting a glass batch. The glass batch can be a simple blend of $Al_2O_3$, CaO, $SiO_2$ (and any other oxides that are desired) in the proportions set out in the preceding section "Sealing compositions".

In some embodiments alternative metal compounds which convert to the metal oxide during melt processing may be used in the glass batch in place of the metal oxide, e.g. metal carbonates, nitrates or phosphates. Where these alternative metal compounds(s) are used, appropriate amounts of compounds in the glass batch can be established by working backwards from the desired amounts of metal oxides in the glass precursor sealing composition. In essence, the same molar amounts are required.

The use of compounds as a precursor to the metal oxide can be advantageous since some metal oxides react with moisture or $CO_2$ in the air over time and thereby change composition which may lead to inaccuracies in weighing appropriate amounts of the metal oxide. Precursor compounds which are more stable to storage than the corresponding metal oxide are particularly preferred. Suitable precursor compounds include metal nitrates, carbonates or phosphates.

It will be appreciated that more complex compounds may also act as a source of the desired constituent metal ions, e.g. tri-calcium phosphate or magnesium silicate. The skilled person is familiar with the manufacture of the glass batch and the variety of compounds that can be used to prepare the glass batch.

Formation of Glass Precursor Sealing Compositions

The glass batch of metal/non-metal oxides or more generally metal/non-metal compounds may be blended as a powder and needs to undergo a melt processing step prior to form the glass precursor sealing composition. In a melt processing step the mixture of compounds (e.g. oxides and/or alternative metal compounds which convert to the metal oxide during melt processing, or perhaps a blend of compounds) is melted to form a homogenous glass melt e.g. at a temperature above 1200° C., such as 1400-1650° C., preferably 1200 to 1800° C., especially at 1450-1600° C.

Preferably the glass batch is heated in a suitable container such as a platinum crucible to a temperature which is sufficient to produce a homogeneous melt (typically 1450-1650° C.).

The glass melt is then cooled to room temperature. Ideally, the glass melt is cooled rapidly, preferably by quenching into water to produce a glass frit. Rapid cooling is preferred as this inhibits devitrification. The use of water quenching is especially preferred as the resulting glass frit is readily milled to form a powder. The cooled glass melt, ideally the glass frit, should therefore be amenable to milling to produce the precursor glass powder.

The amorphous solid that forms after cooling is preferably then comminuted, e.g. milled, to produce the glass precursor sealing composition in the form of a powder. The powder preferably has a mean particle size of 1-200 μm (e.g. measured by laser diffraction), such as 5 to 150 μm, preferably 5 to 100 μm. Where pre-sintered precursor glass preforms are to be produced, a powder size of 10-100 μm is preferred. Where the glass precursor sealing composition is to be applied in the form of a paste, a powder size of 5-10 μm is preferred.

The glass precursor sealing composition may be applied to the joint surfaces by any one of a variety of techniques, such as (but not exclusively) screen printing, painting, ink-jet printing, spraying, dip-coating, etc. It could also be produced in the form of a 'green' preform, such as an un-fired, tape-cast sheet. It will be known to those skilled in the art, that these application methods will generally require that the glass precursor sealing composition be mixed with processing aids such as solvents, binders, plasticizers, dispersants etc. in order to impart suitable processing characteristics (viscosity, wetting, drying etc.) for the chosen application technique.

In an embodiment the precursor glass sealing composition may be incorporated into a paste or made into a preform for ease of application when making a joint. Pastes and preforms will be known to those skilled in the art. Typically, preforms will comprise the precursor glass sealing composition and a binding agent, often an organic binder, such as a polymeric binder, such as PVA, PVB and/or PEG. Pastes will typically comprise the precursor glass sealing composition and a binding agent, often an organic binder, such as a polymeric binder, such as PVA, PVB and/or PEG, and a liquid, such as water or ethanol.

The binder can be combined with the precursor glass sealing composition and pressed into a preform. Conveniently, such a preform can be in the shape of a ring. The binder imparts strength to the powder body, maintaining the precursor glass sealing composition in a geometric form that can be readily applied to a surface.

A preform will typically comprise:
(A) a precursor glass sealing composition of the invention; and
(B) a binder component (such as a polymer).

In an embodiment the precursor glass preform may be in the form of a sheet, such as a tape-cast sheet when used to join two materials together.

In a further embodiment, the sealing composition may be in the form of a paste and this forms a further aspect of the invention. A paste will typically comprise:
(A) a precursor glass sealing composition of the invention; and
(B) a liquid suspension medium (such as ethanol); and
(C) a binder, which may be dissolved in the suspension medium.

The relative amounts of binder/liquid can be tailored to form a suitable viscosity for application.

It will be appreciated that during the sealing process, any organic processing aids which might have been included to facilitate the application of the precursor glass sealing powder to the joint surfaces will burn off if the sealing process is carried out in an atmosphere which contains oxygen, e.g. air. In some embodiments however, it may be necessary to carry out the sealing process in an inert atmosphere.

Alternatively, the precursor glass preform may be sintered to form a sintered precursor glass preform. It is preferred to use a sintered preform in the case where sealing must be carried out in an inert atmosphere since the organic binder, having already been removed in the sintering process, is not present, and cannot decompose/volatilise during the sealing process to contaminate the joint surfaces.

A sintered preform can be prepared by heating the preform in an oxygen containing atmosphere to a temperature above the glass transition temperature but below the crystallisation temperature range. Typically, the temperature should be 50 to 150° C. above the Tg of the material of the precursor glass sealing composition, e.g. 850 to 1010° C.

In a typical procedure the precursor glass sealing powder is shaped to form a 'green' preform of the desired geometry. Organic processing aids such as binders and plasticizers will typically be added to the precursor glass sealing powder prior to shaping to facilitate the shaping operation and impart sufficient green-strength to the shaped part to allow handling. The shaping process may involve pressing in a suitable metal die. The organic processing aid, if added, will burn-off during heating of the shaped preform to the sintering temperature. The precursor glass sealing powder densities at the sintering temperature to form a solid amorphous preform. The sintered preform may take any suitable form, such as a ring.

The minimum viscosity ($\eta_{min}$) of the glass precursor sealing compositions of the invention when measured on the sintered precursor glass according to ASTM C1351M-96 (2012) (Standard Test Method for Measurement of Viscosity of Glass by Viscous Compression of a Solid Right Cylinder) is ideally between $10^4$ Pa·s and $10^8$ Pa·s, preferably $10^4$ to $10^7$ Pa·s, more preferably $10^4$ to $10^6$ Pa·s.

The glass sealing compositions preferably have softening temperatures above 1000° C., preferably above 1150° C. after crystallization. During heating to the sealing temperature, the glass phase flows prior to reaching a temperature of 1000° C. The initial reduction in viscosity seen in the measurements (e.g. as shown in FIG. 1) is due to the increased fluidity of the glass phase as the temperature increases—as heating progresses, the glass phase starts to crystallize, and the volume fraction of crystals gradually increases until flow becomes impossible. By the time the joint has reached 1000 to 1050° C. the sealing material will be solid with very little or no residual glassy phase.

The crystallisation temperature range may vary depending on the precursor glass composition, heating rate and powder particle size, but will typically be in the range 950 to 1100° C.

Glass precursor sealing compositions having a viscosity profile as described herein are highly suitable for sealing applications, since sealing procedures will involve heating to a temperature of 950 to 1100° C. and so under these conditions the glass precursor sealing composition has good ability to sinter, flow and crystallise and thereby form an effective seal with other materials in the joint (described below).

In an embodiment the glass transition temperature (Tg) of the glass precursor sealing composition may be 750 to 900° C.

Preparation of Glass Ceramics

Initially the precursor glass powder (which may be in the form of a 'green' precursor glass preform or a precursor glass paste) is firstly sintered. The precursor glass powder densifies by a process of viscous sintering as the temperature is increased. Sintering typically takes place during the sealing process although a sintered precursor glass preform can also be used in the sealing process. The materials should remain amorphous during sintering—the phase change occurs during crystallization which follows sintering. Sintering typically involves heating to a temperature of 80-130° C. above the $T_g$ of the precursor glass powder, e.g. to a temperature of at least 850° C., or at least 900° C.

The heating process as a whole (which includes sintering, then flow, then crystallisation) typically involves heating the precursor glass sealing composition at a temperature of 1 to 20° C. per minute, such as 1 to 10° C. per minute. Firstly, the sintering temperature is reached. As the temperature is further increased at a controlled heating rate the material flows and as the temperature increases still further it crystallises. Crystallisation typically nucleates at the former surfaces of the precursor glass powder particles. The temperature is typically held at the crystallisation temperature for a period of time to allow completion of the crystallization process. A typical period is 1 to 5 hrs.

A glass-ceramic develops on crystallisation. The glass-ceramic comprises one or several crystalline phases and potentially comprises a residual glass phase. On completion of crystallization, the amount of residual glass phase in the glass-ceramic is limited due to the low silica content of the precursor glass. In a preferred embodiment, the residual glass content is less than 10 vol %.

In terms of chemical make-up, the percentages above for the precursor glass also apply to the glass-ceramic. There is a redistribution or re-arrangement of the constituent elements during the crystallization process, but the overall composition of the material remains unchanged. All the preferred embodiments, such as component percentages, of the precursor therefore apply to the glass-ceramic.

Glass-ceramic compositions of the invention preferably have coefficients of thermal expansion (CTE) in the range 5.5 to $10.0 \times 10^{-6}$ $K^{-1}$ over the range of 25-1000° C., preferably 6.0 to $9.5 \times 10^{-6}$ $K^{-1}$.

Joint Formation

As used herein a "joint" is a structure in which at least a first material and a second material (which may be the same or different) are sealed together by heating in physical contact with the precursor glass sealing composition (which may be in the form of a 'green' preform, sintered preform or a paste). In some embodiments the sealing material may seal together 3 or more materials. It is preferred that the first and second materials of the joint each have CTEs in the range of $5-11 \times 10^{-6}$ $K^{-1}$ (over the range of 25-1000° C.). Preferably the joint comprises a first material and a second material (which may be the same or different) sealed together by the sealing composition of the invention, in which the first and second materials each have CTEs in the range of $5-11 \times 10^{-6}$ $K^{-1}$ (over the range of 25-1000° C.). In general it is preferred that there is no more than $2 \times 10^{-6}$ $K^{-1}$ difference between the CTE of the glass-ceramic and the CTE of each of the first and second materials.

The method of forming a joint comprises the steps of applying a precursor glass sealing composition according to the invention such as in the form of a paste, sintered preform or a green preform between a first material and a second material in the location where the seal is desired, such that good physical contact is obtained, followed by thermal treatment to seal the first and second materials together. Suitable temperatures and heating durations for the heat treatment will readily be established by those skilled in the art. However, by way of illustration, heat treatment typically involves heating the area where the seal is to be formed to a temperature of at least 950° C. As the temperature increases the sealing material sinters then flows. As the temperature rises further, the material begins to crystallise. The temperature is then held at a holding temperature for a period of time (typically at least 1 h) to allow completion of the crystallization process, followed by gradual cooling to room temperature. The maximum holding temperature is typically 1150° C. The sealing composition crystallises to form a glass-ceramic bond with the desired thermal expansion characteristics.

In a preferred embodiment the holding temperature is 950° C. or above, such as 950-1150° C.

The sealing composition may be applied in the form of a sintered preform. Heating will then cause the preform to flow and crystallise to form the desired joint. In a preferred embodiment the holding temperature is 950° C. or above, such as 950 to 1150° C.

A load may be applied during the thermal treatment step to promote flow and bond formation.

The materials to be sealed are typically other ceramics, metallic compositions or ceramic-metal composites (cermets).

In one embodiment the joint is a seal between components of an electrochemical reactor incorporating ceramic membranes.

Once the seal is formed the material can be cooled. Cooling is preferably controlled in order to avoid large thermal gradients which might otherwise cause fracture of the sealed joint. Typical cooling rates may be in the range of 0.5 to 10° C. per minute, such as 1 to 5° C. per minute.

Viewed from another aspect the invention provides a method of forming a seal between a first material and a second material, the method comprising the steps of:

applying a glass precursor sealing composition as hereinbefore defined between first and second materials where the seal is desired;

heating at a heating rate of 1 to 20° C. per minute to a temperature in the range of 900 to 1200° C. to seal the first and second materials together. Preferably, the formed joint is then control cooled, e.g. at 1 to 5° C. per minute back to ambient temperature.

Viewed from another aspect the invention provides a method of forming a seal between a first material and a second material, the method comprising the steps of:

applying a glass precursor sealing composition as hereinbefore defined between first and second materials where the seal is desired;

heating at a heating rate of 1 to 20° C. per minute so that the glass precursor sealing composition first sinters, then flows and then crystallises to seal the first and second materials together. Preferably, the formed joint is then control cooled, e.g. at 1 to 5° C. per minute back to ambient temperature.

The invention will now be described with reference to the following non limiting examples.

Test Methods

Glass CTE and Tg Method

CTE and Tg of the precursor glasses were measured in a horizontal axis dilatometer fitted with alumina pushrod and holder. Sample dimensions were approximately 45 mm long×5 mm×5 mm in cross-section, and a heating rate of 6° C. per minute was employed. A 50 mm sapphire reference, measured under the same conditions, was used to correct for pushrod and holder effects.

Glass-Ceramic CTE Method

CTE of the crystallized materials (glass-ceramics) was measured in a horizontal axis dilatometer fitted with alumina pushrod and holder. Sample dimensions were approximately 45 mm long×5 mm×5 mm in cross-section, and a heating rate of 3° C. per minute was employed. A 50 mm sapphire reference, measured under the same conditions, was used to correct for pushrod and holder effects.

EXAMPLES

By way of example, a number of glasses were prepared to demonstrate how the materials of the present invention made be employed in the sealing of other materials. The compositions of these precursor glasses are presented in Table 1.

TABLE 1

| Glass No. | Composition, mol % | | | | | |
|---|---|---|---|---|---|---|
| | CaO | $Al_2O_3$ | $SiO_2$ | $Y_2O_3$ | BaO | $P_2O_5$ |
| 494 | 37.5 | 20.0 | 40.0 | 2.5 | | |
| 495 | 40.0 | 16.0 | 40.0 | 4.0 | | |
| 496 | 40.0 | 15.0 | 40.0 | 3.0 | 2.0 | |
| 499 | 41.0 | 18.0 | 41.0 | | | |
| 505* | 42.9 | 12.4 | 44.7 | | | |
| 522* | 46.0 | 10.0 | 44.0 | | | |
| 524* | 46.0 | 7.0 | 43.0 | 4.0 | | |
| 559 | 40.0 | 31.0 | 27.0 | | | 2.0 |
| 560 | 35.3 | 26.4 | 36.3 | | | 2.0 |
| 562 | 32.0 | 32.0 | 36.0 | | | |
| 563 | 50.0 | 14.0 | 36.0 | | | |
| 564 | 32.0 | 25.0 | 43.0 | | | |

*Outside scope of invention.

The glasses were prepared by mixing high-purity raw materials in the appropriate proportions, and melting at temperatures in the range 1500-1600° C. in a ZGS platinum crucible until homogenous melts were formed. The melts were quenched by casting onto water to form a friable, amorphous frit. After drying, the frit was milled in an aluminous porcelain mill jar with alumina milling media to yield a glass powder with a mean particle size in the range 5-100 μm. Small glass bars were also cast from each melt to provide a sample for determination of glass CTE and glass transition temperature (Tg). The bars were cast onto a pre-heated metal plate and transferred to a hot chamber furnace soon afterwards for annealing at a temperature of 800° C. The samples were cooled to room temperature at a rate of 3° C./min or less after holding at the annealing temperature for 30 minutes.

The precursor glasses were characterised by measuring CTE (25-700° C.) and glass transition temperature (Tg) in a horizontal axis dilatometer fitted with alumina pushrod and holder. Sample length was 40-50 mm, and the heating rate was 6° C./min.

The suitability of these glasses as sealing materials was assessed by measuring the viscosity during heating at 3° C./min in a parallel plate viscometer (according to ASTM C1351M-96(2012)) using a fused quartz loading rod and holder. Samples for viscosity determination were prepared by pressing discs of the precursor glass powders to which PVA binder had been added, and sintering at a temperature of 90-110° C. above the measured glass transition temperature for 15 minutes. Porosity levels after sintering were estimated to be <5% based on SEM observations on fracture surfaces. Dimensions of the sintered discs were approximately 7 mmØ×1-2 mm thick. Disc samples were placed between two flat alumina discs (17 mmØ×0.64 mm thick) for the viscosity measurement, with the pushrod load of approximately 500 g applied to the top alumina disc. Deformation of the samples was measured by an LVDT. Viscosity versus temperature curves for three of the precursor glasses are shown in FIG. 1 by way of example.

There is a continuous decrease in viscosity as the material is heated above the glass transition temperature, but crystallization gradually occurs, and the rate at which the viscosity falls decreases until a minimum viscosity is reached. Beyond this, the increasing proportion of crystalline phases causes the apparent viscosity to rise rapidly, eventually inhibiting flow completely.

Of particular interest is the minimum viscosity reached during heating to a typical sealing temperature of 1000 to 1100° C. as this is an excellent indicator of the material's ability to flow and form a good bond/seal with the other joint materials. It has been found that joint/seal formation is possible where transient viscosities below approximately $10^7$ Pa·s are reached during heating, though it is preferable to reach viscosities in the range $10^4$-$10^6$ Pa·s to ensure good seal quality.

Bar samples for CTE measurement were prepared from the precursor glass powders (with added PVA binder) by free-form moulding. The green bars were subjected to heat-treatments in the range 1000-1100° C. for 1 hour to convert them to glass-ceramics under simulated sealing/heat-treatment cycles. Thermal expansion characteristics were measured on the resulting glass-ceramics, on samples 40-50 mm in length during heating at 3° C./min to 1000° C., and during cooling at 3° C./min or less to below 50° C. in a horizontal axis dilatometer equipped with alumina pushrod and holder. A 50 mm sapphire reference, measured under the same conditions, was used to correct for pushrod and holder effects. Table 2 presents the expansion, Tg and viscosity results on the precursor glasses and crystallized glass-ceramics.

Table 2: presents the expansion and viscosity results on the pre-cursor glasses and crystallised glass ceramics.

TABLE 2

| Glass No | Glass CTE $10^{-6}$ K$^{-1}$ (25-700° C.) | Glass T$_g$ (° C.) | Viscosity minimum during heating, ($\eta_{min}$) LOG($\eta_{min}$, Pa · s) | CTE after crystal-lization $10^{-6}$ K$^{-1}$ (25-1000° C.) | Crystal-lization heat-treatment |
|---|---|---|---|---|---|
| 494 | 7.5 ± 0.1 | 820 ± 5 | 5.1 ± 0.2 | 7.6 ± 0.1 | 1000° C./1 h |
| 495 | 8.2 ± 0.1 | 825 ± 5 | 5.6 ± 0.2 | 8.5 ± 0.1 | 1050° C./1 h |
| 496 | 8.4 ± 0.1 | 815 ± 5 | 5.6 ± 0.2 | 8.2 ± 0.1 | 1000° C./1 h |
| 499 | 7.8 ± 0.1 | 800 ± 5 | 5.3 ± 0.2 | 7.6 ± 0.1 | 1000° C./1 h |
| 505 | 8.4 ± 0.1 | 805 ± 5 | 4.8 ± 0.2 | 7.9 ± 0.1 | 1050° C./1 h |
| 522 | 8.9 ± 0.1 | 800 ± 5 | 4.4 ± 0.2 | 9.3 ± 0.1 | 1050° C./1 h |
| 524 | 9.0 ± 0.1 | 805 ± 5 | 5.6 ± 0.2 | 9.2 ± 0.1 | 1050° C./1 h |
| 559 | 7.2 ± 0.1 | 840 ± 5 | 5.8 ± 0.2 | 6.8 ± 0.1 | 1050° C./1 h |
| 560 | 6.8 ± 0.1 | 840 ± 5 | 5.3 ± 0.2 | 6.5 ± 0.1 | 1050° C./1 h |
| 562 | 6.3 ± 0.1 | 860 ± 5 | 5.9 ± 0.2 | 6.0 ± 0.1 | 1000° C./1 h |
| 563 | 9.3 ± 0.1 | 805 ± 5 | 6.1 ± 0.2 | 9.5 ± 0.1 | 1000° C./1 h |
| 564 | 9.4 ± 0.1 | 850 ± 5 | 6.2 ± 0.2 | 6.1 ± 0.1 | 1050° C./1 h |

Two examples of how the glass-ceramics of the present invention can be used to produce seals are given below.

Example 1—ZTA Component

Figure 2:
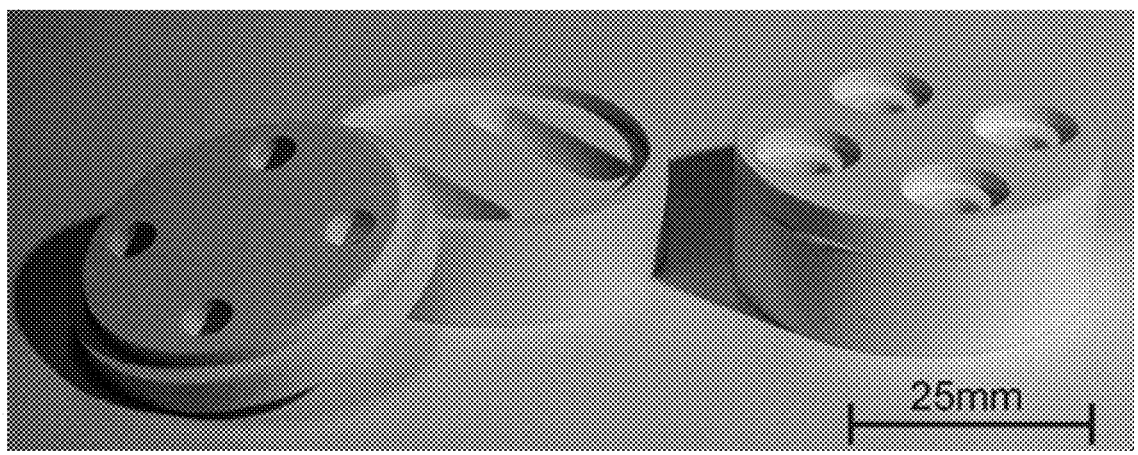
FIG. 2 shows a zirconia toughened alumina (ZTA) manifold demonstrating $CaO$—$Al_2O_3$—$SiO_2$ glass-ceramic seal between lid and body.

A hermetic seal was required between the lid and hollow body of a simple manifold component, fabricated in a zirconia toughened alumina (ZTA) with a CTE of $9.0 \times 10^{-6}$ K$^{-1}$ [25-1000° C.]. The component is shown in FIG. 2. Glass frit of composition (mol %): 50% CaO, 14% Al$_2$O$_3$, 36% SiO$_2$ (glass 563, Table 1) was produced by melting a mixture of the appropriate raw ingredients in a ZGS platinum crucible at 1500° C. for 2 hours and quenching into cold water. The frit was crushed, dried and re-melted for a further 2 hours at 1500° C. to form a homogenous melt. The melt was subsequently quenched into cold water, and the resulting frit was dried and milled to provide a glass powder with a mean particle size in the range 10-30 µm. Expansion measurements indicated that this material has a CTE of $9.5 \times 10^{-6}$ K$^{-1}$ [25-1000° C.] after a heat-treatment at 1000° C. for one hour.

The glass powder was made up to form a free-flowing paste by adding an aqueous 5% solution of a PVA based binder (Optapix PAF 46, Zschimmer & Schwartz, Lahnstein, Germany). The glass powder paste was applied to the rim and on the top surface of the partitioning wall between the two gas plena of the ZTA body and allowed to dry. The ZTA lid was placed on the ZTA body, and the assembly was loaded with a dead weight of 150 g before being placed on a level surface in a chamber furnace. The assembly was heated to a holding temperature of 1000° C. at a rate of 3° C./min, and held at this temperature for 1 hour before cooling at 3° C./min or less to room temperature. The integrity of the seals was checked by applying dye penetrant to the inside of the ZTA component and observing for signs of penetration of the dye through the joint seams. The seal was found to be sound and leak-free.

Example 2—Sealing of a Proton-Conducting Ceramic Membrane Tube into an Alumina Support Tube Glass powder of composition (mol %): 40% CaO, 16% Al$_2$O$_3$, 40% SiO$_2$, 4% Y$_2$O$_3$ [glass 495, Table 1] was produced by melting a mixture of the appropriate raw ingredients in a ZGS platinum crucible at 1500° C. for 2 hours and quenching into cold water. The frit was crushed, dried and re-melted for a further 2 hours at 1500° C. to form a homogenous melt. The melt was subsequently quenched into cold water, and the resulting frit was dried and milled to provide a glass powder with a mean particle size in the range 30-40 µm. Expansion measurements indicated that this material has a CTE of $8.5 \times 10^{-6}$ K$^{-1}$ [25-1000° C.] after a heat-treatment of 1050° C./1 h.

Ring-shaped preforms were produced from this glass powder by pressing in a suitably shaped die. The preforms were produced by a sub-contractor (Mansol Preforms Ltd, Haverhill, UK) using a propriety temporary binder. The pressed preforms were sintered by heating at 3K/min to a temperature of 930° C. in a chamber furnace, and holding at this temperature for 15 minutes before cooling to room temperature at furnace rate. The dimensions of the ring preforms after sintering were approximately 10.8 mm OD×7.6 mm ID×1.5 mm thick.

A sintered ring preform of glass 495 was placed in a 2 mm deep, 11 mm diameter recess at the top end of an alumina tube (12.7 mm OD×6.35 mmID). The lower end of a 10 mm OD×8 mm ID tube, consisting of a dense, thin (30 µm), proton-conducting ceramic membrane (BaCe$_{0.2}$Zr$_{0.7}$Y$_{0.1}$O$_3$) on a porous support tube (nickel/BaCe$_{0.2}$Zr$_{0.7}$Y$_{0.1}$O$_3$ composite), was placed on top of the sintered ring preform and centred (axially). The assembled joint was placed in a closed ended, fused quartz tube in order to maintain alignment of the components during thermal processing. A load of 100 g was placed on top of the joint assembly in the fused quartz tube to ensure good contact at the sealing interfaces and to assist sealant flow. The fused quartz tube and contents were transferred into a vertical tube furnace for sealing. The furnace was purged with an Ar/2% H$_2$ gas mixture, and this atmosphere was maintained during the whole sealing cycle. The components were sealed by heating at 3° C./min to 1050° C., held at this temperature for 1 hour, and then cooled at 3° C./min or less to room temperature.

Figure 3:
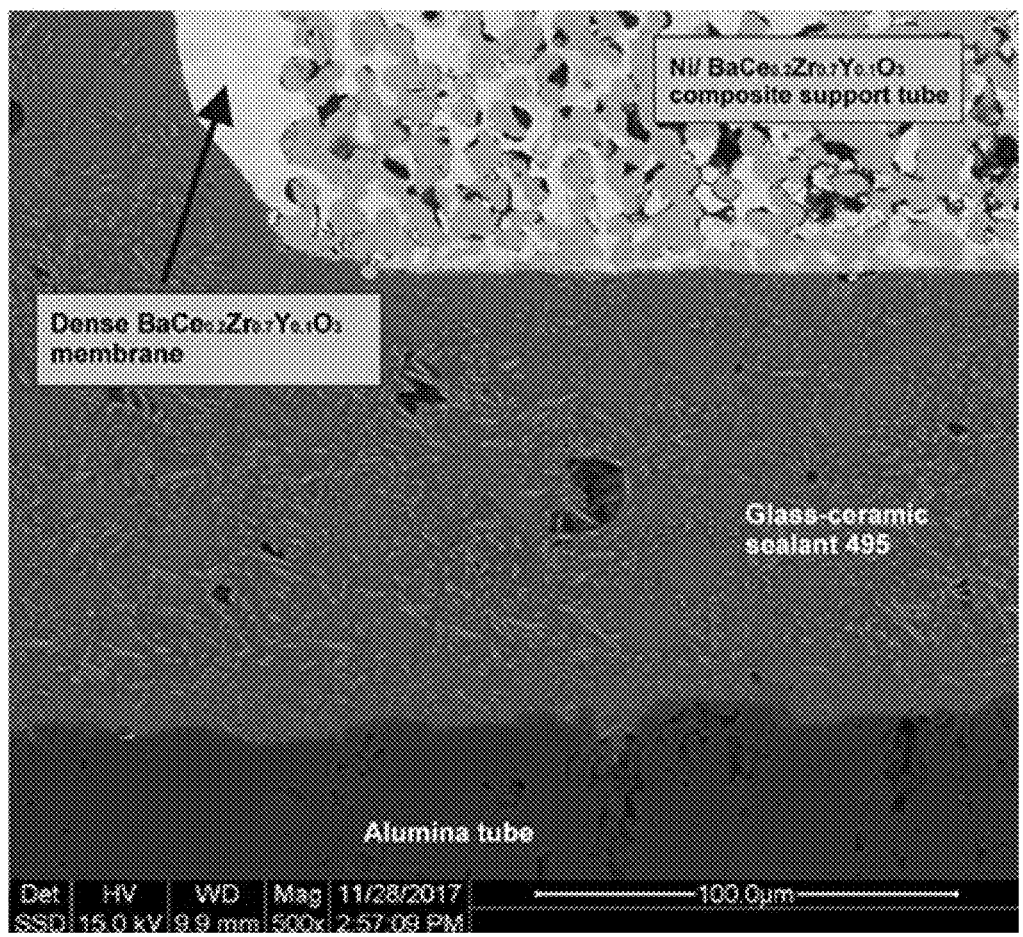
FIG. 3 shows an SEM of polished diametral section of $CaO$—$Al_2O_3$—$SiO_2$ glass-ceramic seal between alumina tube and proton-conducting ceramic membrane tube (dense $BaCe_{0.2}Zr_{0.7}Y_{0.1}O_3$ membrane on porous $Ni/BaCe_{0.2}Zr_{0.7}Y_{0.1}O_3$ composite support tube).

The sealed joint was sectioned and polished in preparation for examination in a Scanning Electron Microscope (SEM). FIG. 3 shows a scanning electron micrograph of the polished joint section which demonstrates that the calcium aluminosilicate glass-ceramic sealant has flowed to fill the joint gap and has formed an effective seal.

The invention claimed is:

1. A glass precursor sealing composition comprising:
   (I) 21-35 mol % Al$_2$O$_3$;
   (II) 31-52 mol % CaO; and
   25-45 mol% SiO$_2$;
   said composition being free of B$_2$O$_3$; and
   wherein the composition has an MgO content of 1 mol % or less and a ZnO content of 1 mol % or less.

2. A composition according to claim 1 wherein the composition comprises 35 to 47 mol % CaO.

3. A composition according to claim 1 wherein the composition comprises 35 to 45 mol % SiO$_2$.

4. A composition according to claim 1 further comprising one or more of ZrO$_2$, TiO$_2$, P$_2$O$_5$, BaO, La$_2$O$_3$, Y$_2$O$_3$, or Nb$_2$O$_5$.

5. A composition according to claim 1 in the form of a powder.

6. A composition according to claim 1 which has an MgO content of 0.5 mol % or less; and
   a Zno content of 1 mol % or less, such as 0.5 mol % or less.

7. A composition according to claim 1 consisting of Al$_2$O$_3$, CaO, SiO$_2$ and optionally one or more oxides selected from P$_2$O$_5$, Y$_2$O$_3$, and ZrO$_2$.

8. A composition according to claim 1 consisting of $Al_2O_3$, CaO, $SiO_2$ and optionally a single oxide selected from $P_2O_5$, $Y_2O_3$, or $ZrO_2$.

9. A composition according to claim 1 consisting of $Al_2O_3$, CaO, $SiO_2$ and optionally one or more oxides selected from $P_2O_5$, $Y_2O_3$, and BaO.

10. A composition according to claim 1 having a minimum viscosity (when measured on a sintered disc in accordance with ASTM C1351M-96(2012)) of 104 to 107 Pa·s, more preferably 104 to 106 Pa·s.

11. A paste, preform or sintered preform comprising a glass precursor sealing composition according to claim 1.

12. A preform comprising a sintered composition according to claim 1.

13. A glass-ceramic composition comprising:
(I) 21-35 mol % $Al_2O_3$;
(II) 31-52 mol % CaO; and
(III) 25-45 mol % $SiO_2$;
said composition being free of $B_2O_3$; and
wherein the composition has an MgO content of 1 mol % or less and a ZnO content of 1 mol% or less.

14. A glass-ceramic composition according to claim 13 wherein the composition has a coefficient of thermal expansion (CTE) of 5.5 to $10 \times 10^{-6}$ $K^{-1}$ over the range of 25-1000° C.

15. A glass-ceramic composition produced from a glass precursor sealing composition as claimed in claim 1.

16. A method of forming a seal between a first material and a second material, the method comprising the steps of:
applying a glass precursor sealing composition as claimed in claim 1 between first and second materials where the seal is desired;
heating at a rate of 1 to 20° C.per minute to a temperature in the range of 950 to 1200° C.; to seal the first and second materials together to form a joint.

17. A method as claimed in claim 16 wherein the temperature is held in range of 950 to 1150° C.for at least 1 hr.

18. A method as claimed in claim 17 wherein after holding, the joint is control cooled at a rate of 1 to 5° C.per minute.

19. A method according to claim 16 wherein the first and second materials each have CTE values in the range of $5\text{-}11 \times 10^{-6}$ $K^{-1}$ over the range of 25-1000° C.

20. A joint comprising the glass-ceramic composition according to claim 13.

21. An electrochemical ceramic membrane reactor comprising at least one joint according to claim 20.

22. A composition according to claim 1 wherein the total content of oxide other than $Al_2O_3$, CaO or $SiO_2$ is in the range of 0 to 5.0 mol %.

* * * * *